UNITED STATES PATENT OFFICE.

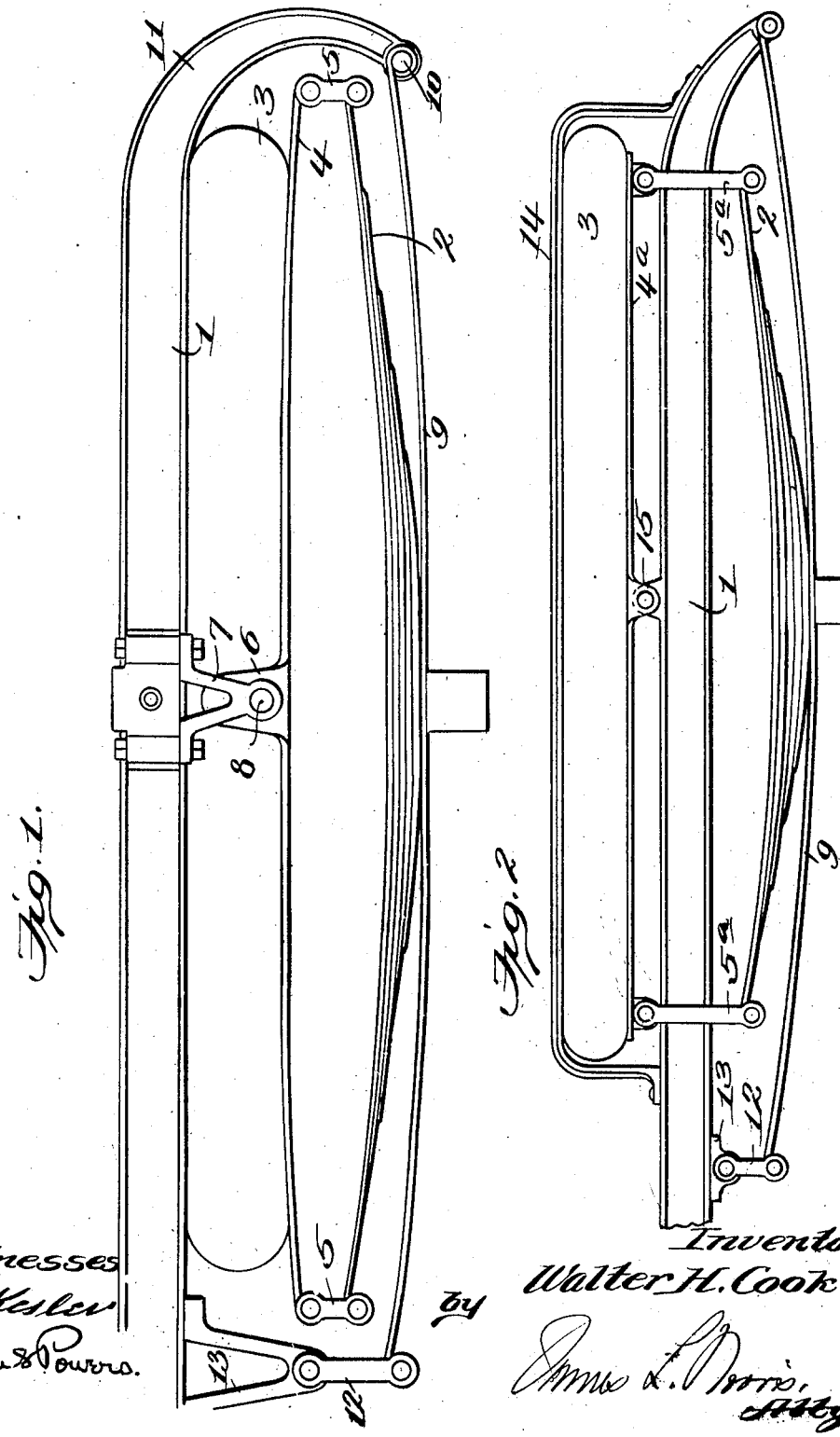

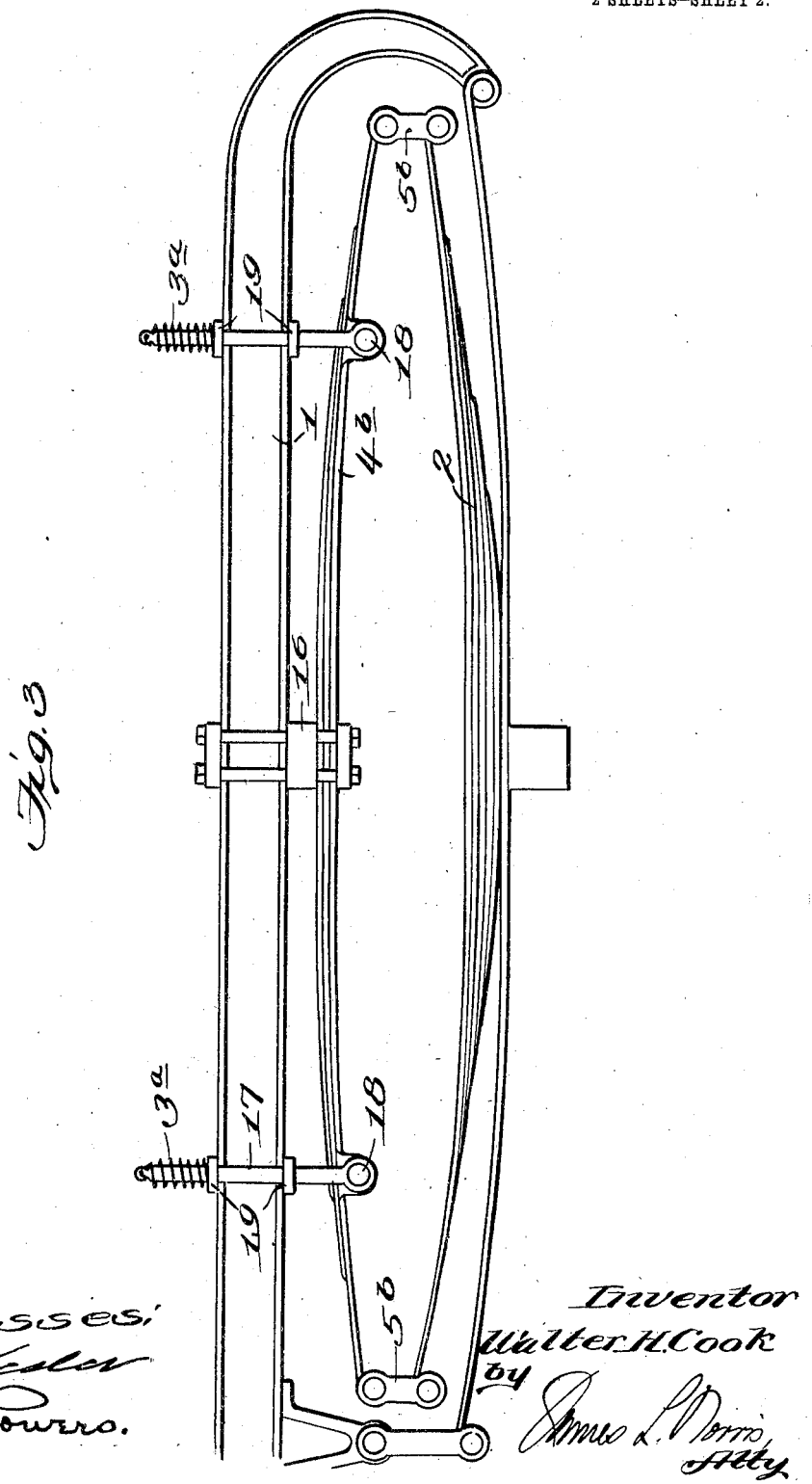

WALTER H. COOK, OF NEW ORLEANS, LOUISIANA.

SHOCK-ABSORBER FOR AUTOMOBILES.

1,058,411.   Specification of Letters Patent.   Patented Apr. 8, 1913.

Application filed July 12, 1912. Serial No. 709,098.

*To all whom it may concern:*

Be it known that I, WALTER H. COOK, a citizen of the United States, residing at New Orleans, in the parish of Orleans and State of Louisiana, have invented new and useful Improvements in Shock-Absorbers for Automobiles, of which the following is a specification.

This invention relates to improvements in shock absorbers for automobiles, of the general type illustrated in my copending application Serial No. 700,268, wherein end portions of the main frame and the shock absorbing agencies are in connected and coacting relation.

The invention is shown as applied to the forward portions of the main frame, but it is equally as applicable to the rear portion of said frame.

The objects of the invention are to provide a shock absorber which may be compactly and securely applied to a main frame of ordinary construction, and wherein a uniform and extremely sensitive cushioning action is secured.

According to the invention, the jars or vibrations of the vehicle in running over rough roads are gradually taken up by one or more springs and are ultimately relieved by a cushioning means. The cushioning means is provided upon, or associated with, a centrally balanced yieldable bar, perferably a spring bar, and the action of the cushioning means may begin at either end of the shock absorber and is of somewhat wave-like character. By preference, an elongated air cushion is employed which extends for substantially the length of the yieldable bar, with which it is associated, and by means of which a somewhat pronounced wave-like shock absorbing action is secured whereby practically all of the vibrations are eliminated.

Embodiments of the invention are illustrated in the accompanying drawings, wherein:

Figure 1 is a side elevation of one form of shock absorber in which the features of the invention are incorporated; Fig. 2 is a similar view showing a slightly modified or alternative construction; and Fig. 3 is a similar view showing a further modified or alternative construction.

Similar characters of reference designate corresponding parts throughout the several views.

The improved shock absorber is combined with the forward portion of each side bar 1 of the main frame and, in the construction shown in Fig. 1, comprehends the mainspring 2 and a pneumatic cushion 3, which consists of an elongated tube of heavy rubber of nearly the same length as the mainspring and disposed longitudinally between said spring and the adjacent bar 1, the bar 1, the spring 2, the cushion 3, and the other associated elements being in a common vertical plane. The cushion 3 is directly disposed between the bar 1 and a spring bar 4, the latter constituting a support for said cushion and being, in effect, a part of the mainspring which it equals in length and to which it is joined at the ends by links 5. The bar 4 is, however, either substantially straight or of slight opposite curvature to the mainspring, and is supported directly from the side bar 1, the connections being located at the center of the bar 4 whereby the latter is exactly balanced and comprising lugs 6 at the sides of the bar 4, brackets 7 which depend from the bar 1, and a pivot pin 8 which connects the lugs 6 and the brackets 7. The direct support for the main spring comprises a spring bar 9 which, in effect, forms a part of the main spring, having the same general direction of curvature, but being of greater length and having its central portion joined to the overlying central portion of said spring. The bar 9 at its forward end is joined, as by a pin 10, to the usual gooseneck 11 of the bar 1, and at its inner end is connected, as by a link 12, to a bracket or hanger 13 which depends from the bar 1. The link 12 allows of the bar 9 having suitable freedom of motion, under the thrust or pull of the car when it is in motion, and said bar consequently holds the main spring 2 at all times in proper position to efficiently receive the first vibratory impulses that may result from the shocks which the vehicle encounters. The links 5 at each end of the mainspring 2 form a connecting support for the spring bar 4 and the latter, owing to its connection with the links 5 and to its central connection, constitutes a balanced bed upon which the air cushion 3 uniformly rests. Owing to the manner of supporting and balancing the bar 4 and to its relation to the air cushion 3, the compression of the air cushion may start at either extremity thereof, so that a wave-like cushioning action is produced which is of the greatest efficiency in uniformly absorbing practically all of the vibrations, even the last ones of slight and reactionary character. It follows that the vehicle is "insulated" from shocks and vibrations and that the mechanisms thereof are efficiently protected against injury. It will be apparent that the provision of the bar 9 refines or modifies the action of the main spring and that the pulsations of said spring are gradually and sensitively transmitted to the cushion 3 by the bar 4, the latter itself taking up some of the shocks or vibrations and, with its extremities first, engaging in the compression of the ends of the cushion 3 and thus producing a wave-like compression of said cushion, whereby any remaining vibrations are finally absorbed.

The main spring 2 has, as will be noted, free action when a shock is first received, and it is only after it has performed its full function that the shock passes to the air tube wherein the last of its vibrations are absorbed. It will, moreover, be noted that the construction above described and other constructions within the purview of the invention, do not entail any stiffening of the main spring beyond the strength required to properly carry its load, but provide for taking up any shocks or vibrations which may prove greater than its capacity to care for and absorb.

The construction shown in Fig. 2 is similar in its principles and in the structural elements employed to the construction shown in Fig. 1, but differs slightly in details of arrangement and is intended for use in connection with vehicle frames in which the bend or gooseneck 11, at the forward end of the side bar 1, is of slight curvature and extent. In this case, as in the previous embodiment, the side bar 1 constitutes a bearing for the cushion, but the latter, instead of being arranged under said side bar, is arranged above the side bar and bears directly against the underside of a longitudinally disposed arch frame 14, the ends of which are rigidly secured to the bar 1. The support for the cushion 3 comprises a longitudinal spring bar 4ª, which corresponds generally to the bar 4 above described, but is arranged above the bar 1, being pivoted at its center to said bar 1 as by connections 15. The construction shown in Fig. 2 includes, also, the main spring 2, the spring bar 9, the connections between the bar 9 and the main spring 2 and between the bar 9 and the bar 1, all as shown in Fig. 1 and above described, and links 5ª which connect the ends of the spring 2 and the bar 4ª, the links 5ª corresponding generally to the links 5 of Fig. 1.

The construction shown in Fig. 3 is similar in its principles to the constructions already described. In this case, however, instead of the air tube cushion 3 employed in the first two embodiments, expansive coil springs 3ª are used. Like the cushion 3, however, these springs have a bearing against the bar 1 and against a shock transmitting element which is connected to the main spring 2. In the previous examples, this shock transmitting element has preferably, though not necessarily, been in the form of a plain bar. In the present example, it is preferably, though not necessarily, in the form of a spring, as 4ᵇ, similar to the spring 2, and is connected to the latter by links 5ᵇ. The spring 2 is connected to the spring bar 9 and the latter is connected to the bar 1, in the manner shown in Fig. 1. The spring 4ᵇ, like the bars 4 and 4ª, is connected centrally of its length, as at 16, to the bar 1, but owing to the resiliency of the spring 4ᵇ, the connection 16 may be of rigid nature, a pivotal connection not being so desirable in this form as in the forms where a plain bar is used as a shock transmitting element which forms a bearing for the cushioning element. The springs 3ª, of which four are preferably employed, surround rods 17, which are pivoted as at 18 to lugs which are suitably provided on the spring 4ᵇ near the ends of the latter. The rods 17 are arranged in pairs adjacent each end of the spring 4ᵇ, and are disposed at each side of the bar 1, passing through guide pieces 19 which are secured on the bar 1. The springs 3ª are connected to the upper ends of the rods 17 and at their lower ends may bear directly against the upper guide pieces 19.

It will be understood that the constructions herein disclosed are to be regarded simply by way of example, and that no specific description herein contained is intended to put any limitation upon the scope of the appended claims which does not inhere in the language thereof.

Having fully described my invention, I claim:

1. In a shock absorber, the combination with a side bar of the main frame and with a longitudinally disposed main spring, of a longitudinally disposed shock transmitting element connected at its ends to said spring and at its center to said side bar, and cushioning means for which the side bar and the shock transmitting element furnish opposed bearings.

2. In a shock absorber, the combination with a side bar of the main frame and with a longitudinally disposed main spring, of a longitudinally disposed resilient shock transmitting element connected at its ends to said spring and at its center to said side bar, and cushioning means for which the side bar and the shock transmitting element furnish opposed bearings.

3. In a shock absorber, the combination with a side bar of the main frame and with a longitudinally disposed main spring, of a longitudinally disposed shock transmitting element connected at its ends by links to said spring and at its center to said side bar, and cushioning means for which the side bar and the shock transmitting element furnish opposed bearings.

4. In a shock absorber, the combination with a side bar of the main frame and with a longitudinally disposed main spring, of a longitudinally disposed shock transmitting element connected at its ends to said spring and at its center to said side bar, cushioning means for which the side bar and the shock transmitting element furnish opposed bearings, and a spring bar having its end portions connected to said side bar and having its central portion connected to the central portion of the main spring, the latter resting on said spring bar.

5. In a shock absorber, the combination with a side bar of the main frame and with a longitudinally disposed main spring, of a longitudinally disposed shock transmitting element connected at its ends by links to said spring and at its center to said side bar, cushioning means for which the side bar and the shock transmitting element furnish opposed bearings, and a spring bar having its end portions connected to said side bar and having its central portion connected to the central portion of the main spring, the latter resting on said spring bar.

6. In a shock absorber, the combination with a side bar of the main frame and with a longitudinally disposed main spring, of a longitudinally disposed shock transmitting element connected at its ends to said spring and at its center to said side bar, and a cushioning element comprising a longitudinally disposed air tube which rests upon and is approximately the same length as the shock transmitting element and for which the side bar and the shock transmitting element furnish opposed bearings.

7. In a shock absorber, the combination with a side bar of the main frame and with a longitudinally disposed main spring, of a longitudinally disposed shock transmitting element connected at its ends to said spring and at its center to said side bar, a cushioning element comprising a longitudinally disposed air tube which rests upon and is approximately the same length as the shock transmitting element and for which the side bar and the shock transmitting element furnish opposed bearings, and a spring bar having its end portions connected to said side bar and having its central portion connected to the central portion of the main spring, the latter resting on said spring bar.

8. In a shock absorber, the combination with a side bar of the main frame and with a longitudinally disposed main spring, of a longitudinally disposed shock transmitting element connected at its ends to said spring and pivotally connected at its center to said side bar, a cushioning element comprising a longitudinally disposed air tube which rests upon and is approximately the same length as the shock transmitting element and for which the side bar and the shock transmitting element furnish opposed bearings, and a spring bar having its end portions connected to said side bar and having its central portion connected to the central portion of the main spring, the latter resting on said spring bar.

9. In a shock absorber, the combination with a side bar of the main frame and with a longitudinally disposed main spring, of a longitudinally disposed shock transmitting element connected at its ends by links to said spring and pivotally connected at its center to said side bar, a cushioning element comprising a longitudinally disposed air tube which rests upon and is approximately the same length as the shock transmitting element and for which the side bar and the shock transmitting element furnish opposed bearings, and a spring bar having its end portions connected to said side bar and having its central portion connected to the central portion of the main spring, the latter resting on said spring bar.

10. In a shock absorber, the combination with a side bar of the main frame and with a longitudinally disposed main spring, of a longitudinally disposed resilient shock transmitting element connected at its ends by links to said spring and pivotally connected at its center to said side bar, a cushioning element comprising a longitudinally disposed air tube which rests upon and is approximately the same length as the shock transmitting element and for which the side bar and the shock transmitting element furnish opposed bearings, and a spring bar having its end portions connected to said side bar and having its central portion connected to the central portion of the main spring, the latter resting on said spring bar.

11. In a shock absorber, the combination with a side bar of the main frame and with a longitudinally disposed main spring, of a longitudinally disposed resilient shock transmitting element arranged under said side bar and connected at its ends by links to said spring and pivotally connected at its center to said side bar, a cushioning element comprising a longitudinally disposed air tube which rests upon and is approximately the same length as the shock transmitting element and for which the side bar and the shock transmitting element furnish opposed bearings, and a spring bar having its end portions connected to said side bar and having its central portion connected to the central portion of the main spring, the latter resting on said spring bar.

12. In a shock absorber, a longitudinally disposed main spring, cushioning means to which the action of the longitudinally disposed main spring is transmitted from the ends of the latter, and a spring bar having its end portions connected to the main frame, and having its central portion connected to the central portion of the main-spring, the latter resting on said spring bar.

13. In a shock absorber, a bar centrally pivoted to the vehicle frame, a cushioning means interposed between the bar and the frame, a main spring connected at each end by links to the bar, and a spring bar having its end portions connected to the main vehicle frame and having its central portion connected to the central portion of the main spring, the latter resting on said spring bar.

14. In a shock absorber, an air tube, a spring bar, and a spring interposed between said air tube and bar and supporting the former and being supported by the latter, both ends of said spring bar being engaged with the main frame of the vehicle.

15. In a shock absorber, the combination, with a side bar of the main frame and with a longitudinally disposed main spring, of a longitudinally disposed shock transmitting element connected at its ends to said spring and at its center to said side bar, a spring bar upon which the main spring rests, pivotal connections between the ends of said spring bar and said side bar, the connection at one end of the spring bar including a link, and cushioning means for which the side bar and the shock transmitting element furnish opposed bearings.

16. In a shock absorber, the combination, with a side bar of the main frame and with a longitudinally disposed main spring, of a longitudinally disposed shock transmitting element connected at its ends to said spring and at its center to said side bar, a spring bar upon which the main spring rests, pivotal connections between the ends of said spring bar and said side bar, the connection at one end of the spring bar including a link, and a longitudinally disposed air cushion which takes its bearings against the side bar and against the shock transmitting element.

17. In a shock absorber, the combination with a side bar of the main frame and with a longitudinally disposed main spring of a longitudinally disposed shock transmitting element, cushioning means for which the side bar and the shock transmitting element furnish opposed bearings, and connections for transmitting the impulses of the main spring to the shock transmitting element and for causing the latter to produce a wave-like compression of the cushioning means.

18. In a shock absorber, the combination with a side bar of the main frame and with a longitudinally disposed main spring of a longitudinally disposed spring bar constituting a shock transmitting element, an elongated longitudinally disposed air cushion for which the side bar and the spring bar furnish opposed bearings, and connections for transmitting the impulses of the main spring to the shock transmitting element and for causing the latter to produce a wave-like compression of the air cushion.

19. In a shock absorber, the combination with a main spring, of a spring bar of greater length than the main spring, supporting means at the ends of the spring bar and including in one instance a link, a second spring bar constituting a shock transmitting element, a cushioning means which is acted on by the second spring bar, and connections for transmitting the impulses of the main spring to the second spring bar and for causing the latter to produce a wave-like compression of the cushioning means.

20. In a shock absorber, the combination with a main spring, of a spring bar of greater length than the main spring, supporting means at the ends of the spring bar and including in one instance a link, a second spring bar constituting a shock transmitting element, an elongated air cushion which rests upon the second spring bar and is acted on thereby, and connections for transmitting the impulses of the main spring to the second spring bar and for causing the latter to produce a wave-like compression of the air cushion.

21. In a shock absorber, the combination with a main spring having a link suspension, of a spring bar constituting a shock transmitting element and to which the impulses of the main spring are transmitted, an elongated air cushion which rests upon the spring bar and is acted on thereby, and connections for causing the spring bar to produce a wave-like compression of the air cushion.

22. In a shock absorber, the combination with a side bar of the main frame and with a longitudinally disposed main spring, of a longitudinally disposed spring bar constituting a shock transmitting element, an elongated longitudinally disposed air cushion for which the side bar and the spring bar furnish opposed bearings, connections for transmitting the impulses of the main spring to the shock transmitting element and for causing the latter to produce a wave-like compression of the air cushion, a longitudinally disposed spring bar to which the main spring is secured, and supports at the ends of the last named spring bar, one of the supports comprising a link.

In testimony whereof I have hereunto set my hand in presence of two subscribing witnesses.

WALTER H. COOK.

Witnesses:
   CHARLES H. NASH,
   ROBERT WATERMAN.